(12) United States Patent
Noguchi

(10) Patent No.: US 9,745,039 B2
(45) Date of Patent: Aug. 29, 2017

(54) OUTBOARD MOTOR

(71) Applicant: YAMAHA HATSUDOKI KABUSHIKI KAISHA, Iwata-shi, Shizuoka-ken (JP)

(72) Inventor: Jun Noguchi, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 0 days.

(21) Appl. No.: 15/203,709

(22) Filed: Jul. 6, 2016

(65) Prior Publication Data

US 2017/0008606 A1 Jan. 12, 2017

(30) Foreign Application Priority Data

Jul. 6, 2015 (JP) .................. 2015-135384

(51) Int. Cl.
| | |
|---|---|
| *B63H 20/32* | (2006.01) |
| *B63J 3/02* | (2006.01) |
| *H02K 1/27* | (2006.01) |
| *H02K 7/18* | (2006.01) |
| *B63J 3/00* | (2006.01) |
| *H02K 11/21* | (2016.01) |
| *H02K 11/25* | (2016.01) |

(52) U.S. Cl.
CPC .............. *B63J 3/02* (2013.01); *B63H 20/32* (2013.01); *H02K 1/2786* (2013.01); *H02K 7/1815* (2013.01); *B63J 2003/002* (2013.01); *H02K 11/21* (2016.01); *H02K 11/25* (2016.01); *H02K 2213/03* (2013.01)

(58) Field of Classification Search
CPC .... B63H 20/32; H02K 1/2786; H02K 7/1815; B63J 3/02
See application file for complete search history.

(56) References Cited

U.S. PATENT DOCUMENTS

| | | | | |
|---|---|---|---|---|
| 6,184,599 | B1* | 2/2001 | Okabe ................ | F02B 61/045 310/54 |
| 6,309,268 | B1* | 10/2001 | Mabru .................. | B63J 3/02 440/1 |
| 2005/0208847 | A1* | 9/2005 | French ................ | F02D 41/083 440/88 L |
| 2011/0175479 | A1* | 7/2011 | Marchitto ............ | H02K 1/2786 310/156.01 |
| 2013/0230380 | A1* | 9/2013 | Allouche .............. | F01D 5/03 415/1 |

FOREIGN PATENT DOCUMENTS

| | | |
|---|---|---|
| JP | 2001-128388 A | 5/2001 |
| JP | 3865157 B2 | 1/2007 |

* cited by examiner

*Primary Examiner* — Stephen Avila
(74) *Attorney, Agent, or Firm* — Rabin & Berdo, P.C.

(57) ABSTRACT

An outboard motor includes an engine, a power generator including a rotor and a stator, a convertor, and an engine cover configured to cover the engine and the power generator. The rotor includes a permanent magnet.

17 Claims, 6 Drawing Sheets

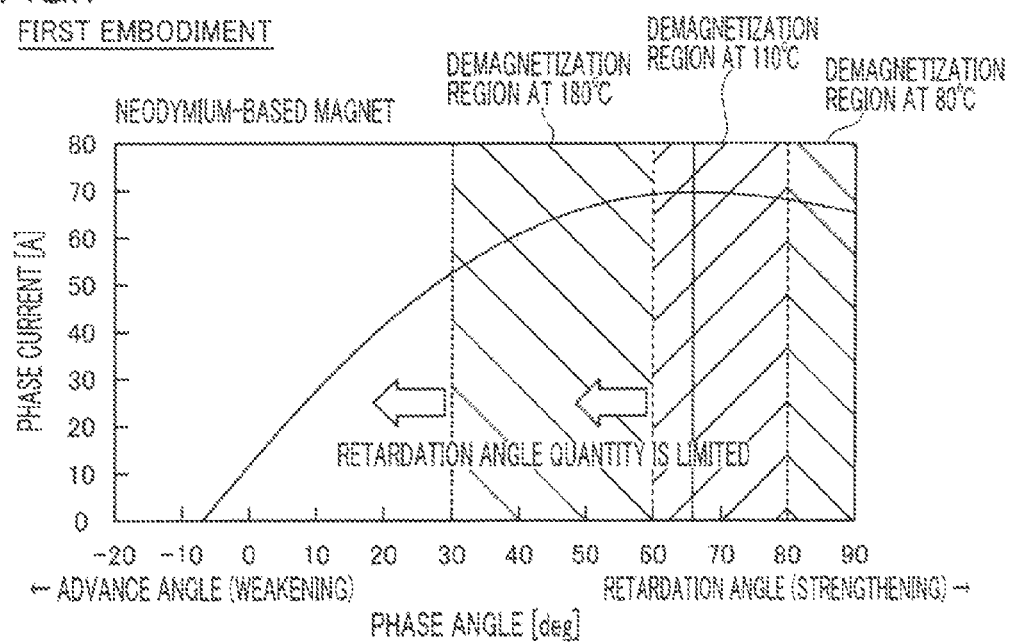
FIG.7 FIRST EMBODIMENT
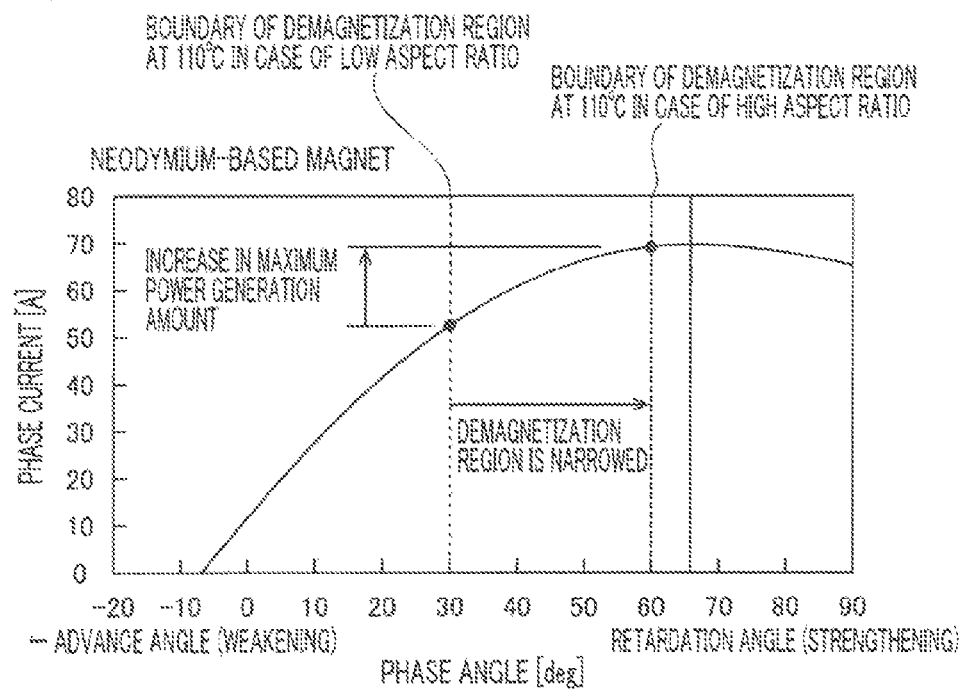
FIG.8

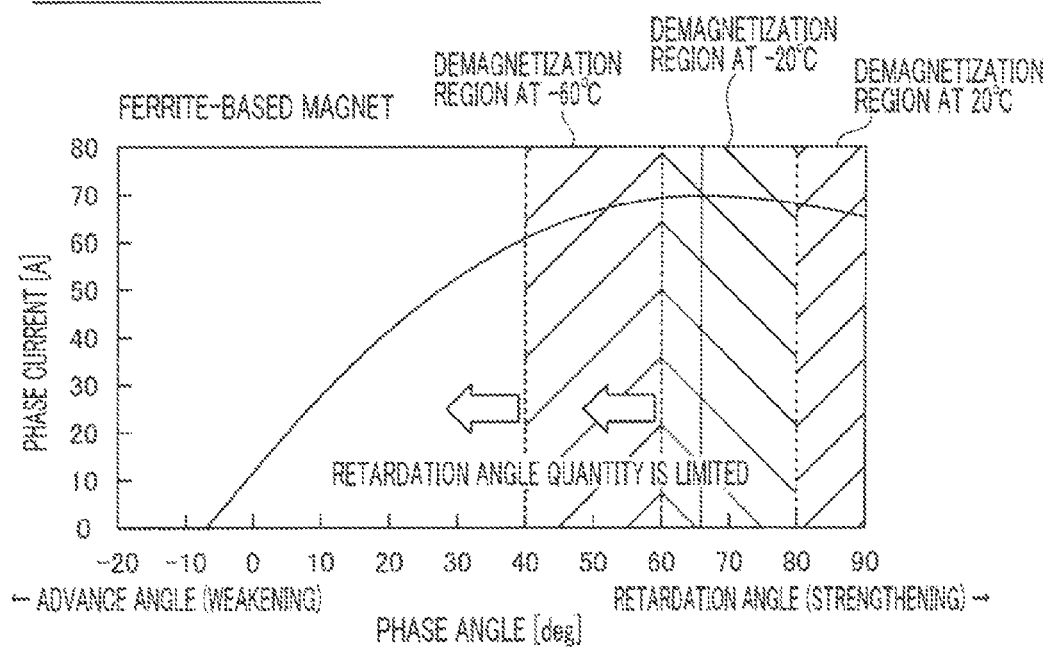

OUTBOARD MOTOR

CROSS-REFERENCE TO RELATED APPLICATION

The priority application number JP2015-135384, entitled "Outboard Motor", and filed Jul. 6, 2015, by Jun Noguchi, upon which this patent application is based, is hereby incorporated by reference in its entirety.

BACKGROUND OF THE INVENTION

Field of the Invention

The present invention relates to an outboard motor, and more particularly, it relates to an outboard motor including a power generator.

Description of the Background Art

An outboard motor including a power generator is known in general. Such an outboard motor is disclosed in Japanese Patent Laying-Open No. 2001-128388, for example.

The aforementioned Japanese Patent Laying-Open No. 2001-128388 discloses an outboard motor including an engine, a power generator driven by the rotation of the engine, and a rectifier that converts alternating-current power output from the power generator into direct-current power.

In general, it is preferable to increase the power generation amount with an increase in the size of a marine vessel mounted with the outboard motor. A power generation system capable of increasing the power generation amount by performing phase control of the power generator is known in general.

When the phase control is performed in order to increase the power generation amount, however, a reverse magnetic field acts on a permanent magnet so that irreversible demagnetization of the permanent magnet disadvantageously easily occurs. Thus, it is difficult to efficiently generate electric power while significantly reducing or preventing the irreversible demagnetization of the permanent magnet. When the size of the power generator is increased in order to increase the power generation amount, the size of a cowling (engine cover) is increased. Thus, when a plurality of outboard motors are mounted adjacent to each other, the adjacent outboard motors easily collide with each other, and the turning angles of the outboard motors are disadvantageously limited.

SUMMARY OF THE INVENTION

Embodiments of the present application provide an outboard motor capable of efficiently generating electric power while significantly reducing or preventing irreversible demagnetization of a permanent magnet.

An outboard motor to a first embodiment includes an engine including a crankshaft. The outboard motor further includes a power generator. The power generator includes a stator, and a rotor driven by the crankshaft to rotate. The rotor includes a permanent magnet provided such that a length of the rotor in a radial direction of the rotor is at least 0.3 times a length of the rotor in a rotation axis direction. The outboard motor further includes a convertor configured to convert alternating-current power output from the power generator into direct-current power. The convertor is capable of performing phase control of electric power generated by the power generator. The outboard motor further includes an engine cover configured to cover the engine and the power generator.

In the outboard motor according to the first embodiment, as hereinabove described, the permanent magnet of the rotor is provided such that the length of the rotor in the radial direction is at least 0.3 times the length of the rotor in the rotation axis direction. Thus, the thickness of the permanent magnet in a magnetization direction (the length in the radial direction) can be increased with respect to the cross-sectional area of the permanent magnet perpendicular to the magnetization direction, and hence a permeance coefficient Pc can be increased. Thus, irreversible demagnetization of the permanent magnet of the rotor can be significantly reduced or prevented. Consequently, a decrease in the power generation amount of the power generator can be significantly reduced or prevented, and hence electric power can be efficiently generated while the irreversible demagnetization of the permanent magnet is significantly reduced or prevented. Furthermore, the length of the rotor in the radial direction is at least 0.3 times the length of the rotor in the rotation axis direction, whereby increases in the sizes of the power generator and the outboard motor (a cowling of the outboard motor) can be significantly reduced or prevented while the demagnetization is significantly reduced or prevented. Thus, when a plurality of outboard motors are mounted adjacent to each other, interference of the adjacent outboard motors with each other can be significantly reduced or prevented, and hence limitation of the turning angles of the outboard motors can be significantly reduced or prevented.

In the aforementioned outboard motor according to the first embodiment, the permanent magnet of the rotor is preferably provided such that the length of the rotor in the radial direction is not more than the length of the rotor in the rotation axis direction. According to this structure, an excessive increase in the thickness of the permanent magnet can be significantly reduced or prevented, and hence an excessive increase in the length of the rotor in the radial direction can be significantly reduced or prevented. Consequently, an increase in the size of the power generator can be significantly reduced or prevented.

In the aforementioned outboard motor according to the first embodiment, a controller controls the phase control to be preferably limited in a control range on the basis of a temperature inside the engine cover. According to this structure, the phase control is limited in the control range according to the temperature such that a reverse magnetic field that acts on the permanent magnet of the rotor can be limited, and hence conditions for occurrence of the irreversible demagnetization of the permanent magnet can be reduced. Thus, the irreversible demagnetization of the permanent magnet can be effectively significantly reduced or prevented.

In this case, the phase control is preferably limited in the control range in a stepwise fashion on the basis of the temperature inside the engine cover. According to this structure, a decrease in the power generation amount resulting from the temperature change can be significantly reduced or prevented, and hence the power generation amount can be efficiently ensured while the irreversible demagnetization of the permanent magnet is significantly reduced or prevented.

In the aforementioned structure in which the phase control is limited in the control range on the basis of the temperature inside the engine cover, the permanent magnet of the rotor may include a neodymium-based magnet, and the controller controls the phase control to be preferably limited in control range when a temperature inside the engine cover is not less than a predetermined threshold value, which is 80° C. or more. According to this structure, irreversible demagnetization of the neodymium-based magnet that occurs at a high temperature can be effectively significantly reduced or prevented. Furthermore, the residual magnetic flux density Br of the neodymium-based magnet is larger than those of other permanent magnets, and hence the power generation amount can be effectively increased.

In the aforementioned structure in which the phase control is limited in the control range on the basis of the temperature inside the engine cover, the permanent magnet of the rotor preferably may include a ferrite-based magnet, and the phase control is preferably limited in the control range when a temperature inside the engine cover is not more than a predetermined threshold value, which is 20° C. or less. According to this structure, irreversible demagnetization of the ferrite-based magnet that occurs at a low temperature can be effectively significantly reduced or prevented.

In the aforementioned outboard motor according to the first embodiment, the rotor includes a flywheel connected to the crankshaft. According to this structure, the number of components can be reduced as compared with the case where the rotor and the flywheel are provided separately from each other.

In the aforementioned outboard motor according to the first embodiment, the rotation axis of the rotor may be arranged coaxially with respect to a rotation axis of the crankshaft. According to this structure, the rotation of the crankshaft can be efficiently transmitted to the rotor of the power generator, and hence the power generation amount can be easily increased.

In the aforementioned outboard motor according to the first embodiment, the rotation axis of the rotor may be arranged on an axis different from the rotation axis of the crankshaft. According to this structure, the degree of freedom of arrangement of the power generator is increased, and hence the power generator is arranged in an empty space inside the engine cover so that the size of the outboard motor can be reduced.

In the aforementioned outboard motor according to the first embodiment, the convertor is preferably arranged inside the engine cover. According to this structure, the convertor is arranged inside the engine cover such that the outboard motor has a compact structure.

In the aforementioned outboard motor according to the first embodiment, the power generator is preferably configured to generate electric power in a state where the convertor performs the phase control. According to this structure, field-strengthening control is performed such that interlinkage magnetic flux can be reinforced by field magnetic flux, and hence the power generation amount can be effectively increased.

An outboard motor according to a second embodiment includes an engine including a crankshaft. The outboard motor further includes a power generator including a stator, and a rotor driven by the crankshaft to rotate. The rotor includes a neodymium-based magnet provided such that a length of the rotor in a radial direction of the rotor is at least 0.2 times a length of the rotor in a rotation axis direction. The outboard motor further includes a convertor configured to convert alternating-current power output from the power generator into direct-current power. The convertor further is capable of performing phase control of electric power generated by the power generator. The outboard motor further includes an engine cover configured to cover the engine and the power generator.

In the outboard motor according to the second embodiment, as hereinabove described, the neodymium-based magnet of the rotor is provided such that the length of the rotor in the radial direction is at least 0.2 times the length of the rotor in the rotation axis direction. Thus, the thickness of the neodymium-based magnet in a magnetization direction (the length in the radial direction) can be increased with respect to the cross-sectional area of the neodymium-based magnet perpendicular to the magnetization direction, and hence a permeance coefficient Pc can be increased. Thus, irreversible demagnetization of the neodymium-based magnet of the rotor can be significantly reduced or prevented. Consequently, a decrease in the power generation amount of the power generator can be significantly reduced or prevented, and hence electric power can be efficiently generated while the irreversible demagnetization of the neodymium-based magnet (permanent magnet) is significantly reduced or prevented.

In the aforementioned outboard motor according to the second embodiment, the outboard motor further comprises a controller controlling the phase control of the converter so that field strengthening in the power generator due to the phase control is limited when a temperature inside the engine cover is not less than a predetermined threshold, which is 80° C. or more. According to this structure, the irreversible demagnetization of the neodymium-based magnet that occurs at a high temperature can be effectively significantly reduced or prevented.

In the aforementioned outboard motor according to the second embodiment, the neodymium-based magnet of the rotor is provided such that the length of the rotor in the radial direction is not more than the length of the rotor in the rotation axis direction.

An outboard motor according to a third embodiment includes an engine including a crankshaft. The outboard motor further includes a power generator including a stator, and a rotor driven by the crankshaft to rotate. The rotor includes a ferrite-based magnet provided such that a length of the rotor in a radial direction of the rotor is at least 0.3 times a length of the rotor in a rotation axis direction. The outboard motor further includes a convertor configured to convert alternating-current power output from the power generator into direct-current power. The convertor further is capable of performing phase control of electric power generated by the power generator. The outboard motor further includes an engine cover configured to cover the engine and the power generator.

In the outboard motor according to the third embodiment, as hereinabove described, the ferrite-based magnet of the rotor is provided such that the length of the rotor in the radial direction is at least 0.3 times the length of the rotor in the rotation axis direction. Thus, the thickness of the ferrite-based magnet in a magnetization direction (the length in the radial direction) can be increased with respect to the cross-sectional area of the ferrite-based magnet perpendicular to the magnetization direction, and hence a permeance coefficient Pc can be increased. Thus, irreversible demagnetization of the ferrite-based magnet of the rotor can be significantly reduced or prevented. Consequently, a decrease in the power generation amount of the power generator can be significantly reduced or prevented, and hence electric power can be efficiently generated while the irreversible demagnetization of the ferrite-based magnet (permanent magnet) is significantly reduced or prevented.

In the aforementioned outboard motor according to the third embodiment, the outboard motor further comprises a controller controlling the phase control of the converter so that field strengthening in the power generator due to the phase control is limited when a temperature inside the engine cover is not more than a predetermined threshold, which is 20° C. or less. According to this structure, the irreversible demagnetization of the ferrite-based magnet that occurs at a low temperature can be effectively significantly reduced or prevented.

In the aforementioned outboard motor according to the third embodiment, the ferrite-based magnet of the rotor is provided such that the length of the rotor in the radial direction is not more than the length of the rotor in the rotation axis direction.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 7 illustrates limitation of the phase control of the power generator of the outboard motor according to the first embodiment of the present invention;

FIG. 8 illustrates a relationship between an aspect ratio and a demagnetization region in the power generator of the outboard motor according to the first embodiment of the present invention; and FIG. 9 illustrates limitation of phase control of a power generator of an outboard motor according to a second embodiment of the present invention.

DESCRIPTION OF THE PREFERRED EMBODIMENTS

Embodiments of the present invention are hereinafter described with reference to the drawings.

First Embodiment (Structure of Outboard Motor Boat)

The structure of an outboard motor boat 10 according to a first embodiment of the present invention is now described with reference to FIGS. 1 and 2. In the figure, arrow FWD represents the forward movement direction of the outboard motor boat 10, and arrow BWD represents the reverse movement direction of the outboard motor boat 10. Furthermore, in the figure, arrow R represents the starboard direction of the outboard motor boat 10, and arrow L represents the portside direction of the outboard motor boat 10.

Figure 1:
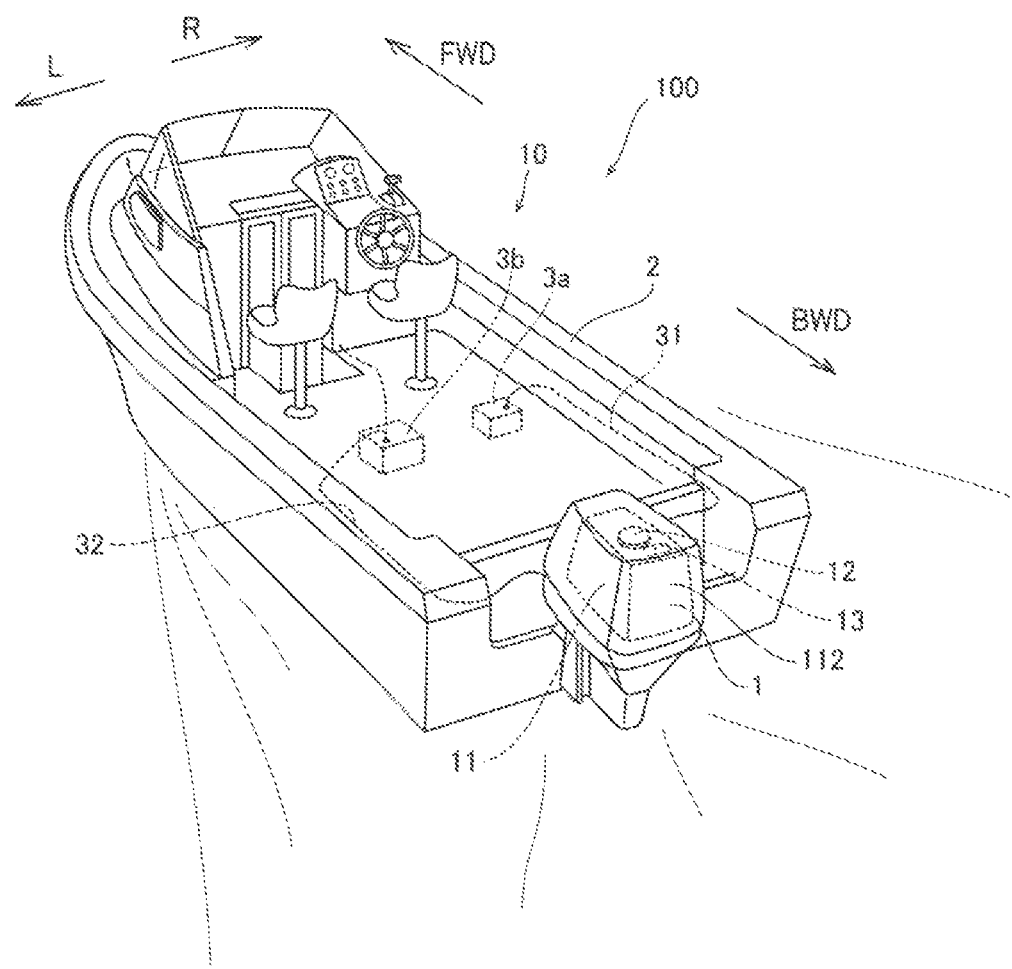
FIG. 1 is a perspective view showing an outboard motor boat including an outboard motor according to a first embodiment of the present invention.

The outboard motor boat 10 includes an outboard motor 1, a boat body 2, an engine battery 3a, and an accessory battery 3b, as shown in FIG. 1. One outboard motor 1 is provided on a rear portion of the boat body 2. The engine battery 3a is connected to the outboard motor 1 through a cable 31. The accessory battery 3b is connected to the outboard motor 1 through a cable 32.

Figure 2:
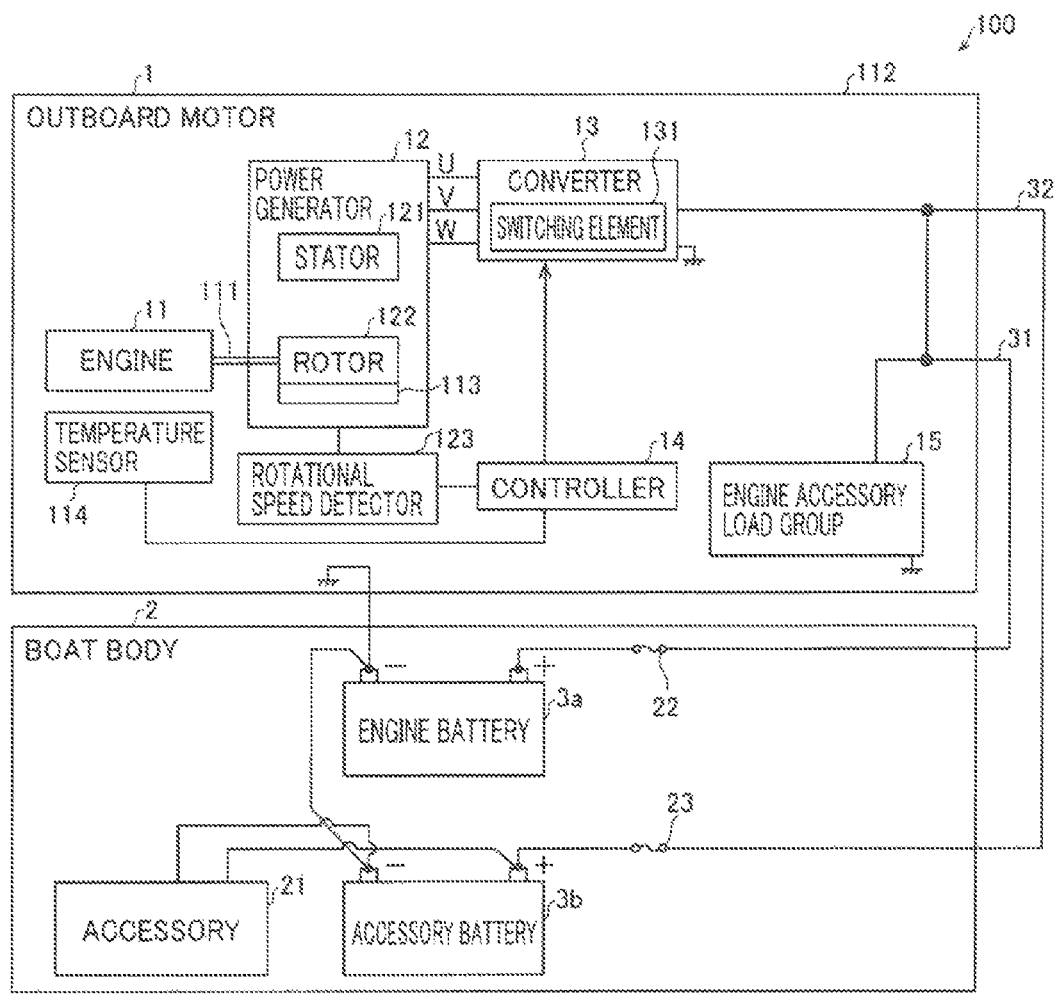
FIG. 2 is a block diagram schematically showing the outboard motor according to the first embodiment of the present invention.

The outboard motor 1 includes an engine 11, a power generator 12, a converter 13, a controller 14, and an engine accessory load group 15, as shown in FIG. 2. The engine 11 includes a crankshaft 111, an engine cover 112 (see FIG. 1), a flywheel 113 (see FIG. 3), and a temperature sensor 114. The power generator 12 includes a stator 121 and a rotor 122. The power generator 12 is provided with a rotational speed detector 123. The converter 13 includes a plurality of switching elements 131.

The outboard motor 1 is arranged to extend to below the engine 11 and further includes a drive shaft configured to transmit the drive force of the engine 11, one propeller shaft that extends in a direction orthogonal to (intersecting with) the drive shaft, and one propeller mounted on a rear end portion of the propeller shaft, rotated together with the propeller shaft.

The boat body 2 is provided with an accessory 21 and fuses 22 and 23, as shown in FIG. 2.

An outboard motor power generation system 100 includes the engine 11, the power generator 12, the converter 13, the controller 14, the temperature sensor 114, the engine battery 3a, and the accessory battery 3b. The engine accessory load group 15 includes a starter motor, an injector, an engine control unit (ECU), and a device configured to drive the engine 11 such as a spark plug. The outboard motor power generation system 100 is provided to supply electric power to the outboard motor boat 10. In other words, the outboard motor power generation system 100 generates and stores electric power to be used by the outboard motor boat 10 and supplies the same to the outboard motor boat 10. As shown in FIG. 1, the power generator 12 and the converter 13 are mounted on the engine 11. The engine 11, the power generator 12, the converter 13, the controller 14, and the engine accessory load group 15 are covered by the engine cover 112.

The engine 11 rotates the crankshaft 111 to rotate the propeller of the outboard motor 1. The rotation of the propeller generates propulsion power, and the boat body 2 moves. During the above rotation of the crankshaft 111 to rotate the propeller, the engine 11 may also rotate the rotor 122 of the power generator 12. The rotation of the rotor 122 generates electromotive force, and the power generator 12 generates electric power. The engine 11 is powered by fuel such as gasoline or gas oil. The temperature sensor 114 is configured to detect the temperature of cooling water that cools the engine 11. As the cooling water for the engine 11, water (seawater or fresh water) in the water in which the outboard motor 1 is arranged is used. The temperature sensor 114 detects the temperature of the cooling water after the cooling of the engine 11.

Figure 3:
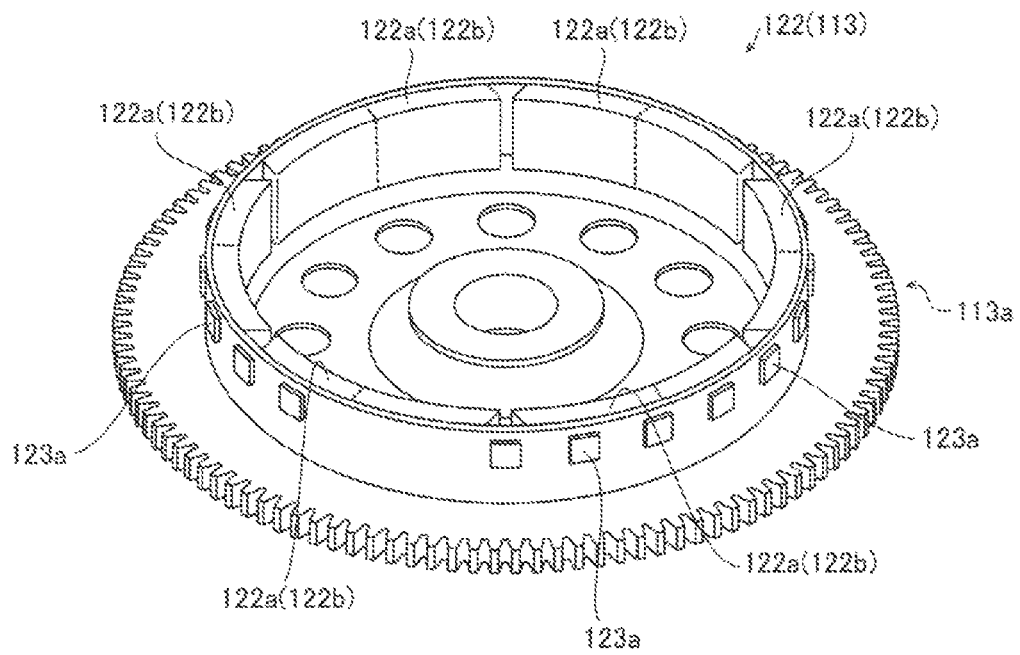
FIG. 3 is a perspective view showing a rotor of a power generator of the outboard motor according to the first embodiment of the present invention.

The power generator 12 is arranged above the engine 11, as shown in FIG. 1. The rotor 122 of the power generator 12 is driven by the crankshaft 111 and rotates with respect to the stator 121. As shown in FIG. 2, the power generator 12 generates alternating-current power of three phases (a U phase, a V phase, and a W phase) by the rotation of the rotor 122. The generated alternating-current power of the three phases is output to the converter 13. The stator 121 includes a coil. As shown in FIG. 3, the rotor 122 includes neodymium-based magnets (permanent magnets) 122a.

The rotor 122 is connected to the crankshaft 111 and also serves as the flywheel 113 of the crankshaft 111. In other words, the rotor 122 is provided integrally with the flywheel 113. The rotor 122 is provided with a gear 113a. The gear 113a of the rotor 122 engages with a gear of the starter motor when the engine 11 is started. In other words, the starter motor is driven when the engine 11 is started so that the crankshaft 111 is rotated.

The rotor 122 is arranged above the engine 11 on the axis of the crankshaft 111. The rotational speed detector 123 detects the rotational speed (number of rotations) of the rotor 122. Specifically, the rotational speed detector 123 includes a plurality of detection protrusions 123a provided on the outer periphery of the rotor 122, as shown in FIG. 3. A sensor detects the plurality of detection protrusions 123a and detects the rotational speed of the rotor 122. The detected rotational speed is transmitted to the controller 14.

Figure 4:
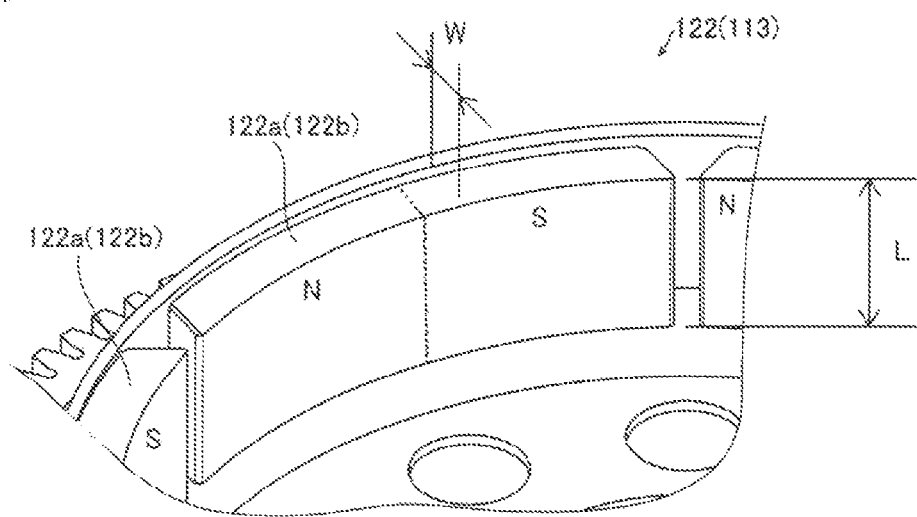
FIG. 4 is a partially enlarged perspective view of the rotor of the power generator of the outboard motor according to the first embodiment of the present invention.

According to the first embodiment, the neodymium-based magnets 122a of the rotor 122 each are provided such that the length W of the rotor 122 in a rotation radial direction (i.e., a radial direction of the rotor 122) is at least 0.2 times the length L of the rotor 122 in a rotation axis direction (i.e., a direction along an axis about which the rotor 122 rotates), as shown in FIG. 4. The rotation radial direction may be perpendicular to the rotation axis direction of the rotor 122. More preferably, the neodymium-based magnets 122a of the rotor 122 each are provided such that the length W of the rotor 122 in the rotation radial direction is at least 0.3 and not more than 1 time the length L of the rotor 122 in the rotation axis direction. A ratio of the length W of the rotor 122 in the rotation radial direction to the length L of the rotor 122 in the rotation axis direction is set to an aspect ratio(=W/L). In other words, the neodymium-based magnets 122a each are provided such that the aspect ratio is at least 0.2.

The neodymium-based magnets 122a of the rotor 122 each are provided such that two poles are integral with each other. In other words, in each of the neodymium-based magnets 122a, one in a circumferential direction has a north pole directed inwardly while the other in the circumferential direction has a south pole directed inwardly. The neodymium-based magnets 122a each are shaped like an arcuate plate.

The converter 13 includes the plurality of switching elements 131. The converter 13 converts alternating-current power output from the power generator 12 into direct-current power. The converter 13 switches the on-off timing of the plurality of switching elements 131 so as to convert the alternating-current power of the three phases into the direct-current power. The converter 13 performs phase control (magnetic field control) of the power generator 12 so as to allow the power generator 12 to efficiently generate electric power. Specifically, the controller 14 controls the converter 13 to advance and delay the timing (phase) of switching of the plurality of switching elements 131 so as to perform the phase control (magnetic field control) of the power generator 12.

The controller 14 controls the outboard motor power generation system 100. Specifically, the controller 14 includes a CPU (central processing unit). The controller 14 controls the switching elements 131 of the converter 13 so as to control the power generation amount of the power generator 12. The controller 14 controls the power generator 12 to generate electric power while controlling the converter 13 to perform the phase control of the power generator 12 in a field-strengthening direction. The controller 14 acquires a temperature inside the engine cover 112 on the basis of the temperature detected by the temperature sensor 114. Specifically, the controller 14 estimates the temperature of the permanent magnets of the power generator 12 on the basis of the temperature detected by the temperature sensor 114.

An electric pathway is branched downstream from the converter 13, and the electric power output from the converter 13 is supplied to each of the engine battery 3a and the accessory battery 3b. The engine accessory load group 15 is connected to the converter 13 and the engine battery 3a.

The accessory 21 includes electrical components such as an air conditioning of a cabin, a refrigerator, a water heater, an audio instrument, and an electric light. The power capacity of the accessory battery 3b is larger than that of the engine battery 3a.

The fuses 22 and 23 are disconnected so that no current flows therethrough when a current exceeding the rating flows. The fuse 22 is arranged between the converter 13 and the engine battery 3a. The fuse 23 is arranged between the converter 13 and the accessory battery 3b.

The engine battery 3a and the accessory battery 3b are arranged outside the engine cover 112 and can be charged with the electric power converted and supplied by the converter 13.

The engine battery 3a supplies electric power to the engine accessory load group 15 through the cable 31. The battery voltage of the engine battery 3a is about 12 V, for example. The accessory battery 3b supplies electric power to the accessory 21. The battery voltage of the accessory battery 3b is about 12 V, for example.

(Description of Phase Control)

Figure 5:
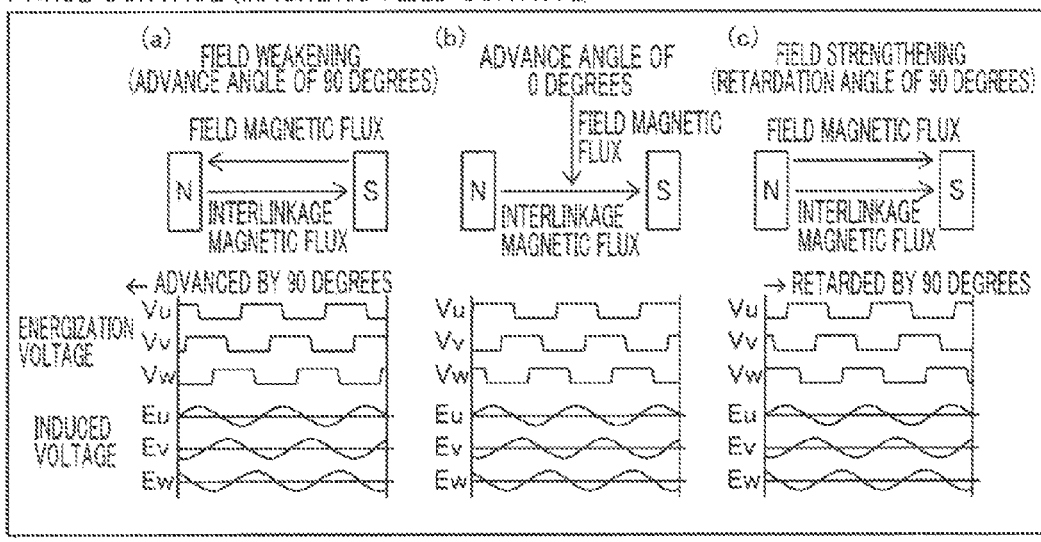
FIG. 5 illustrates phase control of the power generator of the outboard motor according to the first embodiment of the present invention.

The phase control (magnetic field control) of the power generator 12 is now described with reference to FIG. 5.

The phase control is control of adjusting the phases of energization voltages (Vu, Vv, Vw) with respect to induced voltages (Eu, Ev, Ew). As shown in view (b) of FIG. 5, interlinkage magnetic flux and field magnetic flux are orthogonal to each other at an electric angle when the phase angles of the energization voltages agree with the phase angles of the induced voltages (when the advance angles are 0 degrees). In this case, the interlinkage magnetic flux is not influenced by the field magnetic flux, and hence the power generation amount is not changed. As shown in view (a) of FIG. 5, the interlinkage magnetic flux and the field magnetic flux are deviated by 180 degrees at the electric angle (face opposite directions) when the phase angles of the energization voltages are deviated by 90 degrees in a field-weakening direction with respect to the phase angles of the induced voltages (when the advance angles are 90 degrees). In this case, the interlinkage magnetic flux is weakened, and hence the power generation amount is decreased. As shown in view (c) of FIG. 5, the interlinkage magnetic flux and the field magnetic flux face the same directions when the phase angles of the energization voltages are deviated by 90 degrees in the field-strengthening direction with respect to the phase angles of the induced voltages (when the retardation angles are 90 degrees). In this case, the interlinkage magnetic flux is strengthened, and hence the power generation amount is increased. In other words, field-strengthening control is performed so as to increase the power generation amount, and field-weakening control is performed so as to decrease the power generation amount. The phase control is performed when the advance angles are at least −90 degrees and not more than 90 degrees. A direction in which the phase angles are advanced is referred to as the field-weakening direction, and a direction in which the phase angles are retarded is referred to as the field-strengthening direction.

(Description of Irreversible Demagnetization of Permanent Magnet)

Irreversible demagnetization of the permanent magnets is now described with reference to FIG. 6.

Figure 6:
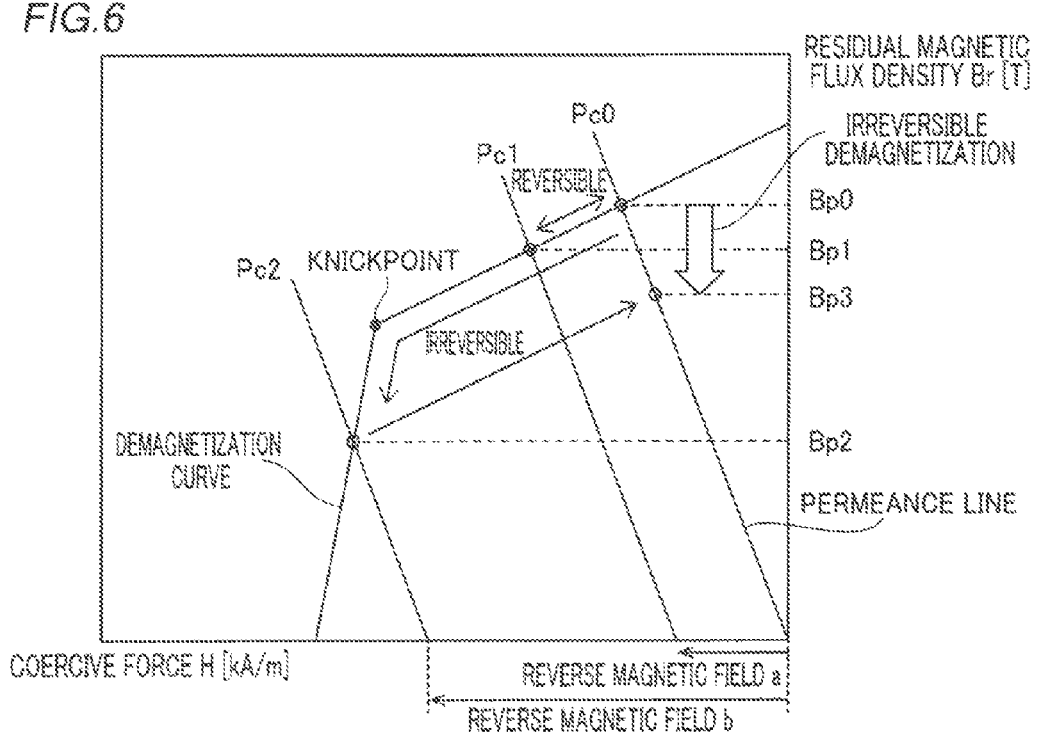
FIG. 6 illustrates irreversible demagnetization of a permanent magnet of the power generator of the outboard motor according to the first embodiment of the present invention.

As shown in FIG. 6, residual magnetic flux density is obtained by a demagnetization curve depending on a temperature and a permeance line depending on a permeance coefficient. When the permeance coefficient is Pc0, for example, operation point magnetic flux density is set to Bp0 from an intersection point between the demagnetization curve and the permeance line. When a reverse magnetic field a is applied by the phase control, the permeance coefficient is decreased to Pc1, which is smaller than Pc0, and the permeance line moves toward a knickpoint at which the demagnetization curve is bent. In this case, the operation point magnetic flux density is decreased to Bp1, which is smaller than Bp0, from an intersection point between the demagnetization curve and the permeance line. After the reverse magnetic field a is applied, the permeance coefficient returns to Pc0, and the operation point magnetic flux density also returns to Bp0 along the demagnetization curve. In other words, when the reverse magnetic field is applied such that the permeance line does not exceed the knickpoint, the operation point magnetic flux density is reversibly changed.

When a reverse magnetic field b larger in absolute value than the reverse magnetic field a is applied by the phase control, the permeance coefficient is decreased to Pc2, which is smaller than Pc0 and Pc1, and the permeance line moves beyond the knickpoint of the demagnetization curve. In this case, the operation point magnetic flux density is decreased to Bp2, which is smaller than Bp0 and Bp1, from an intersection point between the demagnetization curve and the permeance line. After the reverse magnetic field b is applied, the permeance coefficient returns to Pc0. At this time, the operation point magnetic flux density is decreased to Bp3, which is smaller than Bp0, not along the demagnetization curve. In other words, when the reverse magnetic field b is applied such that the permeance line exceeds the knickpoint, the operation point magnetic flux density is irreversibly changed. In this case, the operation point magnetic flux density is irreversibly decreased from Bp0 to Bp3.

In the case of the neodymium-based magnets, irreversible demagnetization occurs at a high temperature. In other words, in the case of the neodymium-based magnets, the permeance line is more likely to be below the knickpoint as the temperature is increased, and hence the neodymium-based magnets are more likely to be demagnetized as the temperature is increased. In the case of ferrite-based magnets, irreversible demagnetization occurs at a low temperature. In other words, in the case of the ferrite-based magnets, the permeance line is more likely to be below the knickpoint as the temperature is decreased, and hence the ferrite-based magnets are more likely to be demagnetized as the temperature is decreased.

(Description of Limitation of Phase Control)

Limitation of the phase control is now described with reference to FIG. 7.

As shown in FIG. 7, the phase angle is controlled in a retardation angle direction (field-strengthening direction) from 0 degrees so that phase current (power generation amount) is increased. In an example shown in FIG. 7, the phase angle is retarded by about 67 degrees so that a maximum output (maximum power generation amount) is obtained.

When the temperature (the temperature of the neodymium-based magnets) inside the engine cover 112 is 80° C., a region in which the retardation angle quantity due to the phase control is 80 degrees or more is a demagnetization region in which the neodymium-based magnets are irreversibly demagnetized. When the temperature (the temperature of the neodymium-based magnets) inside the engine cover 112 is 110° C., a region in which the retardation angle quantity due to the phase control is 60 degrees or more is the demagnetization region in which the neodymium-based magnets are irreversibly demagnetized. When the temperature (the temperature of the neodymium-based magnets) inside the engine cover 112 is 180° C., a region in which the retardation angle quantity due to the phase control is 30 degrees or more is the demagnetization region in which the neodymium-based magnets are irreversibly demagnetized. In other words, the demagnetization region in which the neodymium-based magnets are irreversibly demagnetized is widened as the temperature (the temperature of the neodymium-based magnets) inside the engine cover 112 is increased.

According to the first embodiment, the retardation angle quantity in the field-strengthening direction (retardation angle direction) due to the phase control is limited on the basis of the temperature inside the engine cover 112. Specifically, the controller 14 limits the retardation angle quantity in the field-strengthening direction due to the phase control when the temperature is at least a predetermined value, which is 80° C. or more, on the basis of the temperature inside the engine cover 112.

The controller 14 limits the retardation angle quantity in the field-strengthening direction due to the phase control in a stepwise fashion on the basis of the temperature inside the engine cover 112. In the example shown in FIG. 7, the controller 14 does not limit the retardation angle quantity in the field-strengthening direction due to the phase control when the temperature inside the engine cover 112 is less than 110° C. In other words, the neodymium-based magnets are not irreversibly demagnetized even at the phase angle (retardation angle quantity of about 67 degrees) at which the maximum power generation amount is obtained when the temperature inside the engine cover 112 is less than 110° C., and hence the phase control can be performed until the maximum power generation amount is obtained according to the required power generation amount. The controller 14 limits the retardation angle quantity in the field-strengthening direction due to the phase control to 60 degrees when the temperature inside the engine cover 112 is at least 110° C. and less than 180° C. The controller 14 limits the retardation angle quantity in the field-strengthening direction due to the phase control to 30 degrees when the temperature inside the engine cover 112 is at least 180° C.

(Relationship between Aspect Ratio and Demagnetization Region)

A relationship between the aspect ratio and the demagnetization region is now described with reference to FIG. 8.

As shown in FIG. 8, a boundary of the demagnetization region at the temperature of 110° C. is in the vicinity of a region in which the phase angle is about 60° C. when the aspect ratio(=W/L) is large (when the aspect ratio is at least 0.2). When the aspect ratio(=W/L) is small (when the aspect ratio is less than 0.2), on the other hand, the boundary of the demagnetization region at the temperature of 110° C. is in the vicinity of a region in which the phase angle is about 30° C. In other words, the phase control can be performed in the field-strengthening direction until the phase angle (retardation angle) reaches about 60 degrees when the aspect ratio is large. When the aspect ratio is small, on the other hands, the phase control can be performed in the field-strengthening direction only until the phase angle (retardation angle)

reaches about 30 degrees. Thus, the maximum power generation amount can be increased by increasing the aspect ratio.

Effects of First Embodiment

According to the first embodiment, the following effects are obtained.

According to the first embodiment, as hereinabove described, the neodymium-based magnets 122a of the rotor 122 each are provided such that the length W of the rotor 122 in the rotation radial direction is at least 0.3 times the length L of the rotor 122 in the rotation axis direction. Thus, the thickness of the neodymium-based magnets 122a in a magnetization direction (the length in the rotation radial direction) can be increased with respect to the cross-sectional area of the neodymium-based magnets 122a perpendicular to the magnetization direction, and hence the permeance coefficient Pc can be increased. Thus, the irreversible demagnetization of the neodymium-based magnets 122a of the rotor 122 can be significantly reduced or prevented. Consequently, a decrease in the power generation amount of the power generator 12 can be significantly reduced or prevented, and hence electric power can be efficiently generated while the irreversible demagnetization of the neodymium-based magnets 122a (permanent magnets) is significantly reduced or prevented. According to the first embodiment, as hereinabove described, the neodymium-based magnets 122a of the rotor 122 each are provided such that the length W of the rotor 122 in the rotation radial direction is not more than 1 time the length L of the rotor 122 in the rotation axis direction. Thus, an excessive increase in the thickness of the neodymium-based magnets 122a can be significantly reduced or prevented, and hence an excessive increase in the length W of the rotor 122 in the rotation radial direction can be significantly reduced or prevented. Consequently, an increase in the size of the power generator 12 can be significantly reduced or prevented.

According to the first embodiment, as hereinabove described, the retardation angle quantity in the field-strengthening direction due to the phase control is limited on the basis of the temperature inside the engine cover 112. Thus, the retardation angle quantity due to the phase control is limited according to the temperature such that the reverse magnetic field that acts on the neodymium-based magnets 122a of the rotor 122 can be limited, and hence conditions for occurrence of the irreversible demagnetization of the neodymium-based magnets 122a can be reduced. Thus, the irreversible demagnetization of the neodymium-based magnets 122a can be effectively significantly reduced or prevented.

According to the first embodiment, as hereinabove described, the retardation angle quantity in the field-strengthening direction due to the phase control is limited in a stepwise fashion on the basis of the temperature inside the engine cover 112. Thus, the retardation angle quantity due to the phase control is limited in a stepwise fashion such that a decrease in the power generation amount resulting from the temperature change can be significantly reduced or prevented, and hence a sharp decrease in the power generation amount can be significantly reduced or prevented while the irreversible demagnetization of the neodymium-based magnets 122a is significantly reduced or prevented.

According to the first embodiment, as hereinabove described, the retardation angle quantity in the field-strengthening direction due to the phase control is limited when the temperature is at least the predetermined value, which is 80° C. or more, on the basis of the temperature inside the engine cover 112. Thus, the irreversible demagnetization of the neodymium-based magnets 122a that is likely to be irreversibly demagnetized at a high temperature can be effectively significantly reduced or prevented. The magnetic force of the permanent magnets of the rotor 122 can be increased using the neodymium-based magnets 122a, and hence the power generation amount can be effectively increased.

According to the first embodiment, as hereinabove described, the rotor 122 is provided integrally with the flywheel 113 connected to the crankshaft 111. Thus, the number of components can be reduced as compared with the case where the rotor 122 and the flywheel 113 are provided separately from each other.

According to the first embodiment, as hereinabove described, the rotation axis of the rotor 122 is arranged coaxially with respect to the rotation axis of the crankshaft 111. Thus, the rotation of the crankshaft 111 can be efficiently transmitted to the rotor 122 of the power generator 12, and hence the power generation amount can be easily increased.

According to the first embodiment, as hereinabove described, the converter 13 is arranged inside the engine cover 112. Thus, the converter 13 is arranged inside the engine cover 112 such that the outboard motor 1 has a compact structure.

According to the first embodiment, as hereinabove described, the power generator 12 is configured to generate electric power in a state where the converter 13 performs the phase control of the power generator 12 in the field-strengthening direction. Thus, the field-strengthening control is performed such that the interlinkage magnetic flux can be reinforced by the field magnetic flux, and hence the power generation amount can be effectively increased.

Second Embodiment

A second embodiment of the present invention is now described with reference to FIGS. 3, 4, and 9. In this second embodiment, ferrite-based magnets are used as permanent magnets of a rotor, unlike the aforementioned first embodiment in which the neodymium-based magnets are used as the permanent magnets of the rotor. Portions similar to those of the outboard motor power generation system 100 according to the first embodiment are denoted by the same reference numerals.

According to the second embodiment, a rotor 122 includes ferrite-based magnets (permanent magnets) 122b, as shown in FIG. 3.

As shown in FIG. 4, the ferrite-based magnets 122b of the rotor 122 each are provided such that the length W of the rotor 122 in a rotation radial direction is at least 0.3 times the length L of the rotor 122 in a rotation axis direction, as shown in FIG. 4. More preferably, the ferrite-based magnets 122b of the rotor 122 each are provided such that the length W of the rotor 122 in the rotation radial direction is at least 0.3 and not more than 1 time the length L of the rotor 122 in the rotation axis direction. A ratio of the length W of the rotor 122 in the rotation radial direction to the length L of the rotor 122 in the rotation axis direction is set to an aspect ratio(=W/L). In other words, the ferrite-based magnets 122b each are provided such that the aspect ratio is at least 0.3.

(Description of Limitation of Phase Control)

Limitation of phase control is now described with reference to FIG. 9.

As shown in FIG. 9, a phase angle is controlled in a retardation angle direction (field-strengthening direction) from 0 degrees so that phase current is increased. In an example shown in FIG. 9, the phase angle is retarded by about 67 degrees so that a maximum output (maximum power generation amount) is obtained.

When a temperature (the temperature of the ferrite-based magnets) inside an engine cover 112 is 20° C., a region in which the retardation angle quantity due to the phase control is 80 degrees or more is a demagnetization region in which the ferrite-based magnets are irreversibly demagnetized. When the temperature (the temperature of the ferrite-based magnets) inside the engine cover 112 is −20° C., a region in which the retardation angle quantity due to the phase control is 60 degrees or more is the demagnetization region in which the ferrite-based magnets are irreversibly demagnetized. When the temperature (the temperature of the ferrite-based magnets) inside the engine cover 112 is −60° C., a region in which the retardation angle quantity due to the phase control is 40 degrees or more is the demagnetization region in which the ferrite-based magnets are irreversibly demagnetized. In other words, the demagnetization region in which the ferrite-based magnets are irreversibly demagnetized is widened as the temperature (the temperature of the ferrite-based magnets) inside the engine cover 112 is decreased.

According to the second embodiment, the retardation angle quantity in the field-strengthening direction (retardation angle direction) due to the phase control is limited on the basis of the temperature inside the engine cover 112. Specifically, the controller 14 limits the retardation angle quantity in the field-strengthening direction due to the phase control when the temperature is not more than a predetermined value, which is 20° C. or less, on the basis of the temperature inside the engine cover 112.

The controller 14 limits the retardation angle quantity in the field-strengthening direction due to the phase control in a stepwise fashion on the basis of the temperature inside the engine cover 112. In the example shown in FIG. 9, the controller 14 does not limit the retardation angle quantity in the field-strengthening direction due to the phase control when the temperature inside the engine cover 112 is more than −20° C. In other words, the ferrite-based magnets 122b are not irreversibly demagnetized even at the phase angle (retardation angle quantity of about 67 degrees) at which the maximum power generation amount is obtained when the temperature inside the engine cover 112 is more than −20° C., and hence the phase control can be performed until the maximum power generation amount is obtained according to the required power generation amount. The controller 14 limits the retardation angle quantity in the field-strengthening direction due to the phase control to 60 degrees when the temperature inside the engine cover 112 is more than −60° C. and not more than −20° C. The controller 14 limits the retardation angle quantity in the field-strengthening direction due to the phase control to 40 degrees when the temperature inside the engine cover 112 is not more than −60° C.

The remaining structure of the second embodiment is similar to that of the aforementioned first embodiment.

Effects of Second Embodiment

According to the second embodiment, the following effects are obtained.

According to the second embodiment, as hereinabove described, the ferrite-based magnets 122b of the rotor 122 each are provided such that the length W of the rotor 122 in the rotation radial direction is at least 0.3 times the length L of the rotor 122 in the rotation axis direction, similarly to the aforementioned first embodiment. Thus, the thickness of the ferrite-based magnets 122b in a magnetization direction (the length in the rotation radial direction) can be increased with respect to the cross-sectional area of the ferrite-based magnets 122b perpendicular to the magnetization direction, and hence a permeance coefficient Pc can be increased. Thus, irreversible demagnetization of the ferrite-based magnets 122b of the rotor 122 can be significantly reduced or prevented. Consequently, a decrease in the power generation amount of a power generator 12 can be significantly reduced or prevented, and hence electric power can be efficiently generated while the irreversible demagnetization of the ferrite-based magnets 122b (permanent magnets) is significantly reduced or prevented.

According to the second embodiment, as hereinabove described, the retardation angle quantity in the field-strengthening direction due to the phase control is limited when the temperature is not more than the predetermined value, which is 20° C. or less, on the basis of the temperature inside the engine cover 112. Thus, the irreversible demagnetization of the ferrite-based magnets 122b that is likely to be irreversibly demagnetized at a low temperature can be effectively significantly reduced or prevented.

The remaining effects of the second embodiment are similar to those of the aforementioned first embodiment.

(Modification)

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the neodymium-based magnets are used as the permanent magnets of the rotor in the aforementioned first embodiment and the ferrite-based magnets are used as the permanent magnets of the rotor in the aforementioned second embodiment, the present invention is not restricted to this. According to the present invention, permanent magnets other than the neodymium-based magnets and the ferrite-based magnets may alternatively be used as the permanent magnets of the rotor.

While the temperature (the temperature of the permanent magnets) inside the engine cover is acquired on the basis of the temperature of the cooling water for the engine detected by the temperature sensor in each of the aforementioned first and second embodiments, the present invention is not restricted to this. According to the present invention, a temperature sensor configured to detect the temperature of cooling water that cools the coil of the stator of the power generator or a temperature sensor configured to detect the temperature of the coil may alternatively be used to acquire the temperature (the temperature of the permanent magnets) inside the engine cover. Furthermore, the temperature (the temperature of the permanent magnets) inside the engine cover may alternatively be acquired on the basis of the value of current that flows into the coil. Moreover, a temperature sensor may alternatively be provided in the vicinity of the rotor of the power generator to acquire the temperature (the temperature of the permanent magnets) inside the engine cover.

While the retardation angle quantity in the field-strengthening direction due to the phase control is limited in a stepwise fashion between when the temperature inside the engine cover is at least 110° C. and less than 180° C. and when the temperature inside the engine cover is at least 180°

C. in the aforementioned first embodiment and the retardation angle quantity in the field-strengthening direction due to the phase control is limited in a stepwise fashion between when the temperature inside the engine cover is more than −60° C. and not more than −20° C. and when the temperature inside the engine cover is not more than −60° C. in the aforementioned second embodiment, the present invention is not restricted to this. According to the present invention, the retardation angle quantity may alternatively be limited in a stepwise fashion using another temperature as a boundary.

While the converting device (converter) is arranged inside the engine cover of the outboard motor in each of the aforementioned first and second embodiments, the present invention is not restricted to this. According to the present invention, the converting device may alternatively be arranged outside the engine cover of the outboard motor.

While the rotor (power generator) is arranged above the engine on the axis of the crankshaft in each of the aforementioned first and second embodiments, the present invention is not restricted to this. According to the present invention, the rotor (power generator) may alternatively be arranged below the engine on the axis of the crankshaft. Furthermore, the rotation axis of the rotor may alternatively be arranged on an axis different from the rotation axis of the crankshaft. For example, the rotor may be arranged away from the crankshaft, and the power of the crankshaft may be transmitted to the rotor through a drive belt, a chain, a gear, or the like.

While a plurality of batteries including the engine battery and the accessory battery are connected to the outboard motor in each of the aforementioned first and second embodiments, the present invention is not restricted to this. According to the present invention, one battery may alternatively be connected to the outboard motor.

While one outboard motor is provided in each of the aforementioned first and second embodiments, the present invention is not restricted to this. According to the present invention, two or more outboard motors may alternatively be provided. In this case, an engine battery may be provided for each of the two or more outboard motors.

While the power generator of the outboard motor is used to generate electric power in each of the aforementioned first and second embodiments, the present invention is not restricted to this. According to the present invention, the power generator may alternatively be used as a motor in addition to being used to generate electric power. For example, electric power is distributed to the power generator, whereby the power generator may be used as a starter motor or a motor configured to assist the starter motor.

While the phase control is limited in control range by the limitation of the retardation angle quantity in each of the aforementioned first and second embodiments, the present invention is not restricted to this. According to the present invention, the phase control may alternatively be limited in control range by the limitation of the advance angle quantity. The phase control may be limited in control range by the limitation of the advance angle quantity, using the retardation angle of 90 degrees in FIGS. 7 and 8 as a reference, for example. Furthermore, a reference position (a phase angle serving as a reference) itself may alternatively be varied by the temperature such that the phase control is limited in control range.

What is claimed is:

1. An outboard motor comprising:
   an engine including a crankshaft;
   a power generator including
      a stator, and
      a rotor driven by the crankshaft to rotate, the rotor including a permanent magnet provided such that a length of the rotor in a radial direction of the rotor is at least 0.3 times a length of the rotor in a rotation axis direction;
   a convertor configured to convert alternating-current power output from the power generator into direct-current power, the convertor further being capable of performing phase control of electric power generated by the power generator; and
   an engine cover configured to cover the engine and the power generator.

2. The outboard motor according to claim 1, wherein the permanent magnet of the rotor is provided such that the length of the rotor in the radial direction is not more than the length of the rotor in the rotation axis direction.

3. The outboard motor according to claim 1, further comprising a controller controlling the phase control of the converter so that the phase control is limited to a control range based upon a temperature inside the engine cover.

4. The outboard motor according to claim 3, wherein the controller controls the phase control of the converter so that the phase control is limited to the control range in a stepwise fashion on the basis of the temperature inside the engine cover.

5. The outboard motor according to claim 3, wherein
   the permanent magnet of the rotor includes a neodymium-based magnet, and
   the controller controls the phase control of the converter so that the phase control is limited to the control range when the temperature inside the engine cover is not less than a predetermined threshold, which is 80° C. or more.

6. The outboard motor according to claim 3, wherein
   the permanent magnet of the rotor includes a ferrite-based magnet, and
   the controller controls the phase control of the converter so that the phase control is limited to the control range when the temperature inside the engine cover is not more than a predetermined threshold, which is 20° C. or less.

7. The outboard motor according to claim 1, wherein the rotor includes a flywheel connected to the crankshaft.

8. The outboard motor according to claim 1, wherein the rotation axis of the rotor is arranged coaxially with respect to a rotation axis of the crankshaft.

9. The outboard motor according to claim 1, wherein the rotation axis of the rotor is arranged on an axis different from a rotation axis of the crankshaft.

10. The outboard motor according to claim 1, wherein the convertor is arranged inside the engine cover.

11. The outboard motor according to claim 1, wherein
    the power generator is configured to generate the electric power in a state where the convertor performs the phase control.

12. An outboard motor comprising:
    an engine including a crankshaft;
    a power generator including
       a stator, and
       a rotor driven by the crankshaft to rotate, the rotor including a neodymium-based magnet provided such that a length of the rotor in a radial direction of the rotor is at least 0.2 times a length of the rotor in a rotation axis direction;
    a convertor configured to convert alternating-current power output from the power generator into direct-current power, the convertor further being capable of performing phase control of electric power generated by the power generator; and an engine cover configured to cover the engine and the power generator.

13. The outboard motor according to claim 12, further comprising a controller controlling the phase control of the converter so that field strengthening in the power generator due to the phase control is limited when a temperature inside the engine cover is not less than a predetermined threshold, which is 80° C. or more.

14. The outboard motor according to claim 12, wherein the neodymium-based magnet of the rotor is provided such that the length of the rotor in the radial direction is not more than the length of the rotor in the rotation axis direction.

15. An outboard motor comprising:

an engine including a crankshaft;

a power generator including a stator, and a rotor driven by the crankshaft to rotate, the rotor including a ferrite-based magnet provided such that a length of the rotor in a radial direction of the rotor is at least 0.3 times a length of the rotor in a rotation axis direction;

a convertor configured to convert alternating-current power output from the power generator into direct-current power, the convertor further being capable of performing phase control of electric power generated by the power generator; and an engine cover configured to cover the engine and the power generator.

16. The outboard motor according to claim 15, further comprising a controller controlling the phase control of the converter so that field strengthening in the power generator due to the phase control is limited when a temperature inside the engine cover is not more than a predetermined threshold, which is 20° C. or less.

17. The outboard motor according to claim 15, wherein the ferrite-based magnet of the rotor is provided such that the length of the rotor in the radial direction is not more than the length of the rotor in the rotation axis direction.

* * * * *